United States Patent
Wayman et al.

(10) Patent No.: US 9,460,056 B2
(45) Date of Patent: Oct. 4, 2016

(54) DYNAMIC IMAGE LAYOUT FOR PERSONALIZED PACKAGES

(71) Applicant: Xerox Corporation, Norwalk, CT (US)

(72) Inventors: Elizabeth Dubiel Wayman, Ontario, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 204 days.

(21) Appl. No.: 13/746,960

(22) Filed: Jan. 22, 2013

(65) Prior Publication Data

US 2014/0208196 A1  Jul. 24, 2014

(51) Int. Cl.
*G06F 17/21* (2006.01)

(52) U.S. Cl.
CPC .................. *G06F 17/211* (2013.01)

(58) Field of Classification Search
CPC .... G06F 17/211; G06F 17/50; G06F 17/248; G06T 19/00; G06T 2219/021; G06T 19/20
USPC .......................................... 715/234
See application file for complete search history.

(56) References Cited

U.S. PATENT DOCUMENTS

| | | |
|---|---|---|
| 5,353,390 A | 10/1994 | Harrington |
| 7,243,303 B2 | 7/2007 | Purvis et al. |
| 7,346,408 B2 | 3/2008 | Van Bael et al. |
| 7,599,088 B2 | 10/2009 | Bru |
| 7,765,469 B2 | 7/2010 | Sembower et al. |
| 1,005,288 A1 | 3/2011 | Eschbach et al. |
| 7,941,465 B2 | 5/2011 | Gombert et al. |
| 1,014,933 A1 | 6/2011 | Goetz et al. |
| 7,983,792 B2 | 7/2011 | Gombert et al. |
| 8,160,992 B2 | 4/2012 | Gombert et al. |
| 8,170,706 B2 | 5/2012 | Gombert et al. |
| 8,174,720 B2 | 5/2012 | Gombert et al. |
| 8,757,479 B2 * | 6/2014 | Clark et al. ................. 235/375 |
| 2002/0122067 A1 * | 9/2002 | Geigel et al. ............... 345/788 |
| 2005/0028074 A1 * | 2/2005 | Harrington ........... G06F 17/211 715/234 |
| 2005/0050052 A1 * | 3/2005 | Zimmerman et al. ........ 707/100 |
| 2005/0055635 A1 * | 3/2005 | Bargeron et al. ............ 715/525 |
| 2005/0168780 A1 * | 8/2005 | Kobashi et al. ............ 358/1.18 |
| 2006/0155699 A1 * | 7/2006 | Purvis ................... G06F 17/248 |
| 2006/0193008 A1 * | 8/2006 | Osaka et al. ................ 358/1.18 |
| 2007/0079236 A1 * | 4/2007 | Schrier et al. .............. 715/517 |
| 2008/0256439 A1 * | 10/2008 | Boreham et al. ............ 715/246 |
| 2009/0002764 A1 * | 1/2009 | Atkins ................... G06T 11/60 358/1.18 |
| 2009/0067753 A1 * | 3/2009 | Hanechak .................. 382/298 |
| 2009/0282782 A1 | 11/2009 | Walker et al. |
| 2010/0058943 A1 | 3/2010 | Bober |

(Continued)

*Primary Examiner* — Amy M Levy
(74) *Attorney, Agent, or Firm* — Fox Rothschild LLP

(57) ABSTRACT

A method of determining a layout of a structural document may include receiving a plurality of images, determining a design associated with a structural document, determining a number of facets associated with the structural document based on the determined design, determining an image area associated with the structural document, and determining a layout associated with the structural document based on the determined image area. The method may include determining an image aspect ratio associated with each of the plurality of received images, determining an area aspect ratio associated with each of the one or more areas, assigning each received image to one of the one or more areas based on the determined aspect ratio associated with the image and the determined area aspect ratio associated with the area, and causing a graphical representation of the structural document to be displayed.

13 Claims, 6 Drawing Sheets

TOP

RIGHT SIDE

LEFT SIDE

FRONT

BACK

BOTTOM

(56) References Cited

U.S. PATENT DOCUMENTS

| | | |
|---|---|---|
| 2010/0095204 A1* | 4/2010 | Kobayashi .................... 715/700 |
| 2010/0207986 A1 | 8/2010 | Hyman |
| 2011/0013203 A1* | 1/2011 | Grosz et al. .................. 358/1.2 |
| 2011/0028292 A1 | 2/2011 | Zhang et al. |
| 2011/0116133 A1 | 5/2011 | Walker et al. |
| 2013/0033634 A1* | 2/2013 | Sudheendra et al. .... 348/333.05 |
| 2013/0120767 A1 | 5/2013 | Mandel et al. |
| 2013/0120770 A1 | 5/2013 | Mandel et al. |
| 2014/0038801 A1 | 2/2014 | Morgana et al. |
| 2014/0040319 A1 | 2/2014 | Morgana et al. |
| 2014/0067104 A1 | 3/2014 | Osterhout |
| 2014/0121800 A1 | 5/2014 | Morgana et al. |
| 2014/0129018 A1 | 5/2014 | Morgana et al. |
| 2014/0139849 A1 | 5/2014 | Eschbach et al. |

* cited by examiner

DYNAMIC IMAGE LAYOUT FOR PERSONALIZED PACKAGES

BACKGROUND

Current tools for generating personalized structural documents—i.e., packages are often tedious, time consuming to use, provide limited design options and/or require graphic design expertise to utilize. In addition, current design tools are deficient when dealing with structural documents having a run length of one where the geometry of the structural document changes for each instantiation. For example, some tools require a user to specify the size and location of each individual photograph by dragging and dropping the photograph to the desired location on a structural document. Other tools are more sophisticated, but require graphic design expertise to use.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. Nothing in this document is to be construed as an admission that the embodiments described in this document are not entitled to antedate such disclosure by virtue of prior invention. As used herein, the term "comprising" means "including, but not limited to."

In an embodiment, a method of determining a layout of a structural document may include receiving, by a first computing device, a plurality of images from a second computing device, determining a design associated with a structural document, determining a number of facets associated with the structural document based on the determined design, and determining an image area associated with the structural document. The image area may indicate a number of images to be displayed on each facet of the structural document. The method may include determining a layout associated with the structural document based on the determined image area. The layout may include one or more areas associated with each facet. The method may include determining an image aspect ratio associated with each of the plurality of received images, determining an area aspect ratio associated with each of the one or more areas, assigning each received image to one of the one or more areas based on the determined aspect ratio associated with the image and the determined area aspect ratio associated with the area, and causing a graphical representation of the structural document to be displayed at the second computing device. Each received image may be displayed on its assigned area on the graphical representation.

In an embodiment, a system of determining a layout of a structural document may include a computing device and a computer-readable storage medium in communication with the computing device. The computer-readable storage medium may include one or more programming instructions that, when executed, cause the computing device to receive a plurality of images from a second computing device, determine a design associated with a structural document, determine a number of facets associated with the structural document based on the determined design, determine an image area associated with the structural document, and determine a layout associated with the structural document based on the determined image area. The image area may indicate a number of images to be displayed on each facet of the structural document. The layout may include one or more areas associated with each facet. The computer-readable storage medium may include one or more programming instructions that, when executed, cause the computing device to determine an image aspect ratio associated with each of the plurality of received images, determine an area aspect ratio associated with each of the one or more areas, assign each received image to one of the one or more areas based on the determined aspect ratio associated with the image and the determined area aspect ratio associated with the area, and cause a graphical representation of the structural document to be displayed at the second computing device. Each received image may be displayed on its assigned area on the graphical representation.

DETAILED DESCRIPTION

The following terms shall have, for purposes of this application, the respective meanings set forth below:

An "area" of a structural document refers to at least a portion of a face on which an image can be displayed.

An "aspect ratio" refers to a measurement of a relationship between a width and a height of a space, such as, for example, an area of a structural document face.

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

A "face" refers to a surface of a structural document. For example, a structural document having a cube shape may have six faces.

A "structural document" is an item that is printed on a flat substrate made of, for example and without limitation, paper, cardboard, vinyl, or other material on which, for example and without limitation, printed material, cut lines and/or score lines may be applied. A structural document may be constructed by folding or otherwise manipulating the substrate to provide three-dimensional features or to produce a three-dimensional package. Examples of structural documents may include gift boxes, gift bags, photo cubes, megaphones, ornaments, paper dolls, folded cards and/or the like.

Structural documents can have a variety of applications and uses. For example, a personalized structural document may be used in a gift-wrap scenario where the structural document serves as a super-pack or mantle-pack to an existing package. The structural document may be the outer surface of an actual gift, similar to that of gift wrap. However, unlike giftwrap which is normally discarded after use, a structural document may be kept as a separate item or memento.

Figure 1:
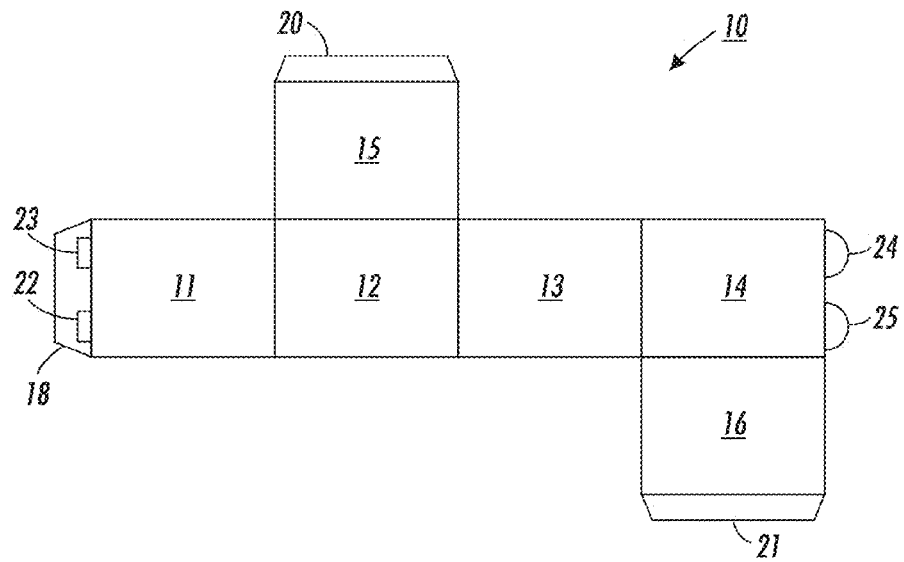
FIG. 1 illustrates an example of a package flat that may be formed into a three-dimensional package according to an embodiment.

FIG. 1 shows an example of a package flat 10 that may be formed into a three-dimensional package. This package flat 10, in this case a rectangular box, includes a variety of faces 11-16. Faces 11-14 may be considered sides, while faces 15 and 16 may be considered to be the top and bottom lids of the package. Each of the faces may be considered to be an exterior-facing facet. In an embodiment, a face may describe one or more faces of a structural document if the image or images on that face are related through superimposition on the final version of the structural document. In an embodiment, a face may be a combination of one or more sides or surfaces of a structural document. For example, a face may be a combination of a left side and a front side of a cube structural document design. Images that are displayed on such a face may wrap around the left side and front side. Additional and/or alternate combinations and faces may be used within the scope of this disclosure.

Facets also may include various functional elements that provide a connecting or other structural function for other elements of the package. Functional elements may include folds, lids, lips, tabs, flaps, receptacles, or other structures that either extend into or are received by a face or a corresponding functional element. Examples shown in FIG. 1 include flaps 20 and 21, along with locking tabs 24, 25 and a corresponding lip 18 with slots 22, 23 that receive the tabs when the package is folded.

In an embodiment, a customer who is creating a structural document may provide personalized images and/or data to be displayed on an outer surface of the structural document. The layout of these images and data on the three-dimensional surface of a structural document may be automatically determined. As such, a customer may be able to create visually pleasing structural documents without any prior design or other experience.

The production of structural documents may be performed by a package generation system that is capable of performing printing operations on, and applying creases and cuts to, a substrate. The system also may perform other actions such as coating and/or stacking the substrate. Examples of automated package production systems include those in the iGen® series of digital production printing presses, available from Xerox Corporation, in connection with corresponding finishing devices. Other systems may include smaller printing devices, such as a Xerox Docu-Color® 250, or a digital cutter as offered by a variety of manufacturers.

Figure 2:
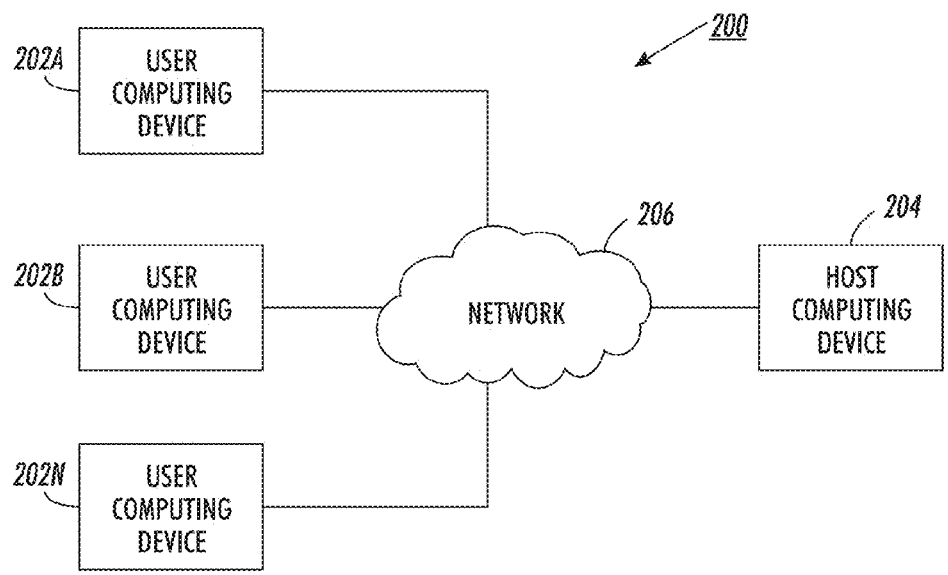
FIG. 2 illustrates a block diagram of a system for assigning a print job to a production device according to an embodiment.

FIG. 2 illustrates an example system of automatically determining a layout of a structural document according to an embodiment. As illustrated by FIG. 2, the system 200 may include one or more user computing devices 202a-N and a host computing device 204. A user computing device 202a-N may include a desktop computer, a laptop computer, a mobile computing device, a tablet computing device, a personal digital assistant and/or other computing devices.

In an embodiment, a host computing device 204 may be located remotely from a user computing device 202a-N. A host computing device 204 may be a web server or other type of computing and/or processing device. In an embodiment, a user may access the host computing device 104 from a user computing device 202a-N using a web browser. For example, a user may enter or select a URL address in a web browser on a user computing device 202a-N to access the host computing device 204. In an embodiment, a user may be required to login or otherwise provide user authentication to access the a host computing device 204 by, for example and without limitation, providing a username and/or password.

In an embodiment, a user computing device 202a-N may be in communication with a host computing 204 device via a communication network 206. In various embodiments, the communication network 206 may be a local area network (LAN), a wide area network (WAN), a mobile or cellular communication network, an extranet, an intranet, the Internet and/or the like. In an embodiment, the communication network 206 may provide communication capability between a user computing device 202a-N and a host computing device 204. A user computing device 202a-N may communicate across the network 206 using any suitable communications protocol. For example, a user computing device 202a-N may communicate with a host computing device 204 via a wireless connection to a router that is connected to the Internet.

Figure 3:
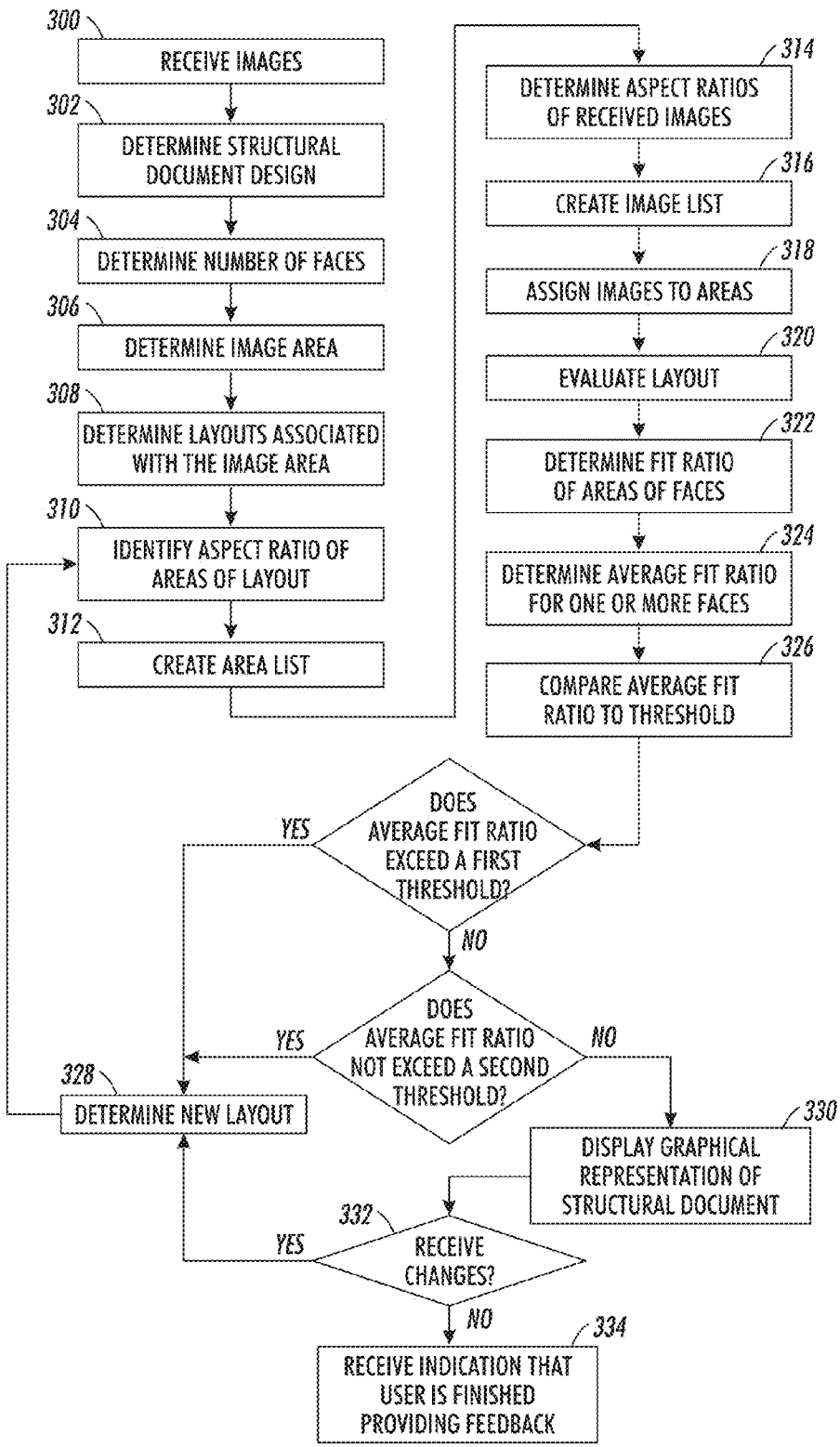
FIG. 3 illustrates an example method of automatically determining a layout of a structural document according to an embodiment.

FIG. 3 illustrates an example method of automatically determining a layout of a structural document according to an embodiment. As illustrated by FIG. 3, one or more images may be received 300. An image may include text, pictures, graphics or other visual images to be displayed on at least a portion of an outer surface of a structural document. In an embodiment, one or more images may be received from a customer or user. For example, a customer may upload one or more images to be displayed on a structural document.

In an embodiment, a structural document design may be determined 302. A structural document design may be determined based on a selection by a user. For example, a user may select a structural document design from a menu of possible structural document designs. In an alternate embodiment, a user may specify a custom structural document design. In an embodiment, the size of a structural document, and therefore the face attributes of such structural document, may be dynamic. For example, the size of a structural document may be changed by, for instance, a user. In response, one or more face attributes may automatically be adjusted to reflect the new size.

In an embodiment, a number of faces or other facets of a structural document may be determined 304. In the examples provided below, the system will only consider faces of the document. However, in various embodiments, functional elements also may be included, or any subset or combination of a structural document's available facets may be considered. A number of faces on which images are to be displayed may be determined 304. A face may be one or more surfaces of a structural document. For example, a structural document having a cube design may have six faces: a top, a bottom, a left side, a right side, a front and a back. As another example, a structural document have an octagon design may have eight faces. Additional and/or alternate designs and/or number of faces may be used within the scope of this disclosure.

In an embodiment, a number of faces may be determined 304 based on the determined structural document design. For example, a structural document design may require that one or more images be displayed on all faces of a structural document except one. For instance, a structural document having a cube design may require that one or more images be displayed on all faces except the bottom.

In an embodiment, a structural document design may be modified by a user. A user may choose to have images displayed on more or fewer faces than specified by a structural document design. For example, a cube structural document design that only permits images to be displayed on five faces may be modified by a user so that images are displayed on all six faces.

In an embodiment, an image area may be determined 306. An embodiment, an image area may be an average image area. An image area may be indicative of an area of a face and/or a number of images per face. In an embodiment, an image area may be determined 306 by dividing a measure of the available area for imaging by the number of received images to yield an image area. In an embodiment, an image area may be represented by the following:

$$I_{area} = \frac{2(w*h + w*d + h*d)}{N}$$

where
N=the number of received images;
w=width of a structural document;
d=depth of the structural document; and
h=height of the structural document.

In an embodiment, this representation may be used to determine an image area for non-rectangular structural documents. In an embodiment, the representation for determining an image area may be adjusted to reflect any restrictions present in the design criteria. For example, the representation may be adjusted to reflect that the available image area on a bottom portion of a structural document is zero.

As an example, the image area for a structural document having a width of 3 units, height of 4 units, depth of 5 units and 8 received images may be equal to 11.75 (i.e., $$\frac{2(3*4 + 3*5 + 4*5)}{8}).$$

In an embodiment, eight images may be displayed on six faces of a structural document. The six faces may have sizes of 12, 12, 15, 15, 20 and 20 units, respectively. One or more images may be allocated by determining a difference between a face size and an image area.

For instance, referring to the example above, the image area of 11.75 may be subtracted from the face sizes of the six structural document areas to yield values of 0.25, 0.25, 3.25, 3.25, 8.25 and 8.25 units. As such, one image may be allocated to the faces having sizes of 12 and 15 area unites, and two images may be allocated to the remaining two faces.

Figure 4:
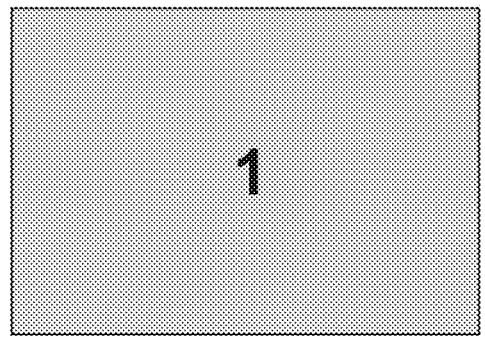
FIGS. 4-9 illustrate example faces of a structural document according to an embodiment.

In an embodiment, one or more layouts associated with the determined image area may be determined 308 for one or more faces of a structural document design. A face layout may include one or more different areas where personalized data may be displayed. FIGS. 4-9 illustrate example layouts for faces according to an embodiment. As illustrated by FIG. 4, a face may have a single area where personalized data may be displayed. This layout may be associated with a face having a determined image number of '1'.

Figure 5:
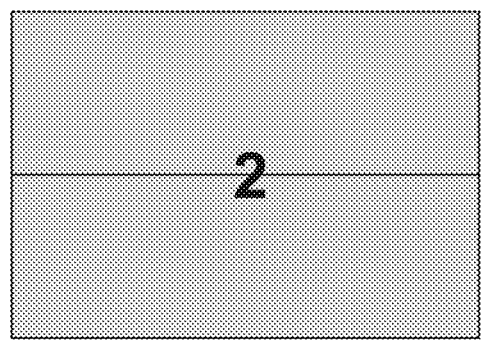
Figure 6:
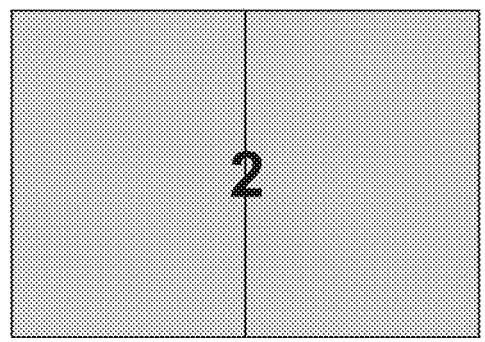

As illustrated by FIG. 5 and FIG. 6, a face may have two areas on which personalized data may be displayed. FIG. 5 illustrates one configuration of two areas on a face, while FIG. 6 illustrates another configuration of two areas on the face. These layouts may be associated with a face having a determined image number of '2'.

Figure 7:
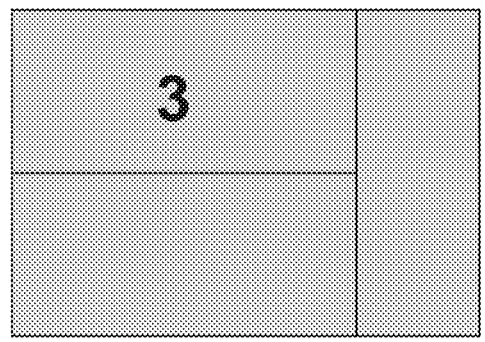
Figure 8:
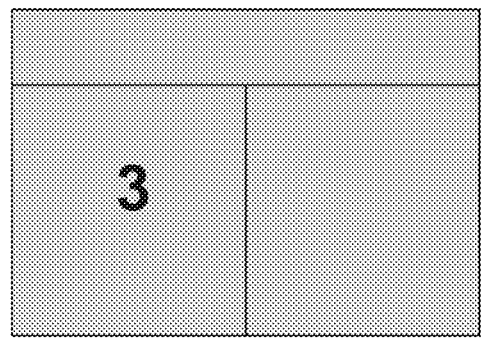
Figure 9:
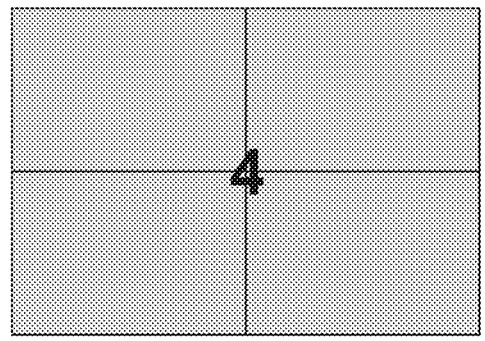

As illustrated by FIG. 7 and FIG. 8, a face may have three areas on which personalized data may be displayed. FIG. 7 illustrates one configuration of three areas on a face, while FIG. 8 illustrates another configuration of three areas on the face. These layouts may be associated with a face having an image number of '3'. As illustrated by FIG. 9, a face may have four areas on which personalized data may be displayed. This layout may be associated with a face having an image number of '4'.

In an embodiment, an aspect ratio associated with one or more of the areas of a determined layout may be identified 310. An aspect ratio may define a relationship between a width and a height of an image area. An aspect ratio may be represented by x:y, where the width is divided into 'x' units of equal length and the height is divided into 'y' units of equal length. In an embodiment, each area may have an associated orientation. An orientation may refer to the direction that images is displayed in the area. For example, each area may be associated with a portrait or a landscape orientation. Additional and/or alternate orientations may be used within the scope of this disclosure.

Referring back to FIG. 4, a single image may have the same aspect ratio as the face of the structural document to which the image is allocated. FIG. 5 and FIG. 6 illustrate example embodiments where the aspect ratio of two images is different than the aspect ratio of the associated face. For example, FIG. 5 illustrates a face having an aspect ratio of x:y and an image aspect ratio of x:(y/2). As another example, FIG. 6 illustrates a face having an aspect ratio of x:y and an image aspect ratio of (x/2):y.

In an embodiment, an aspect ratio of an area may be dependent on the size of the structural document. For instance, an aspect ratio associated with a 3"×3" area may be 3:3=1, whereas an aspect ratio associated with a 3"×2" area may be 3:2=1.5. Table 1 illustrates example differences in aspect ratios associated with FIGS. 4-6 assuming two different face sizes. 3"×3" and 3"×2". For example, referring to Table 1, a face illustrated by FIG. 4 having a size of 3"×3" may have an aspect ratio of '1', whereas a face illustrated by FIG. 4 having a size of 3"×2" may have an aspect ratio of "1.5".

TABLE 1

| Structural Document Face | Size = 3" × 3" | Size = 3" × 2" |
| --- | --- | --- |
| FIG. 4 | 3:3 = 1 | 3:2 = 1.5 |
| FIG. 5 | 3:(3/2) = 2 | 3:(2/2) = 3 |
| FIG. 6 | (3/2):3 = 0.5 | (3/2):2 = 0.75 |

Figure 10:
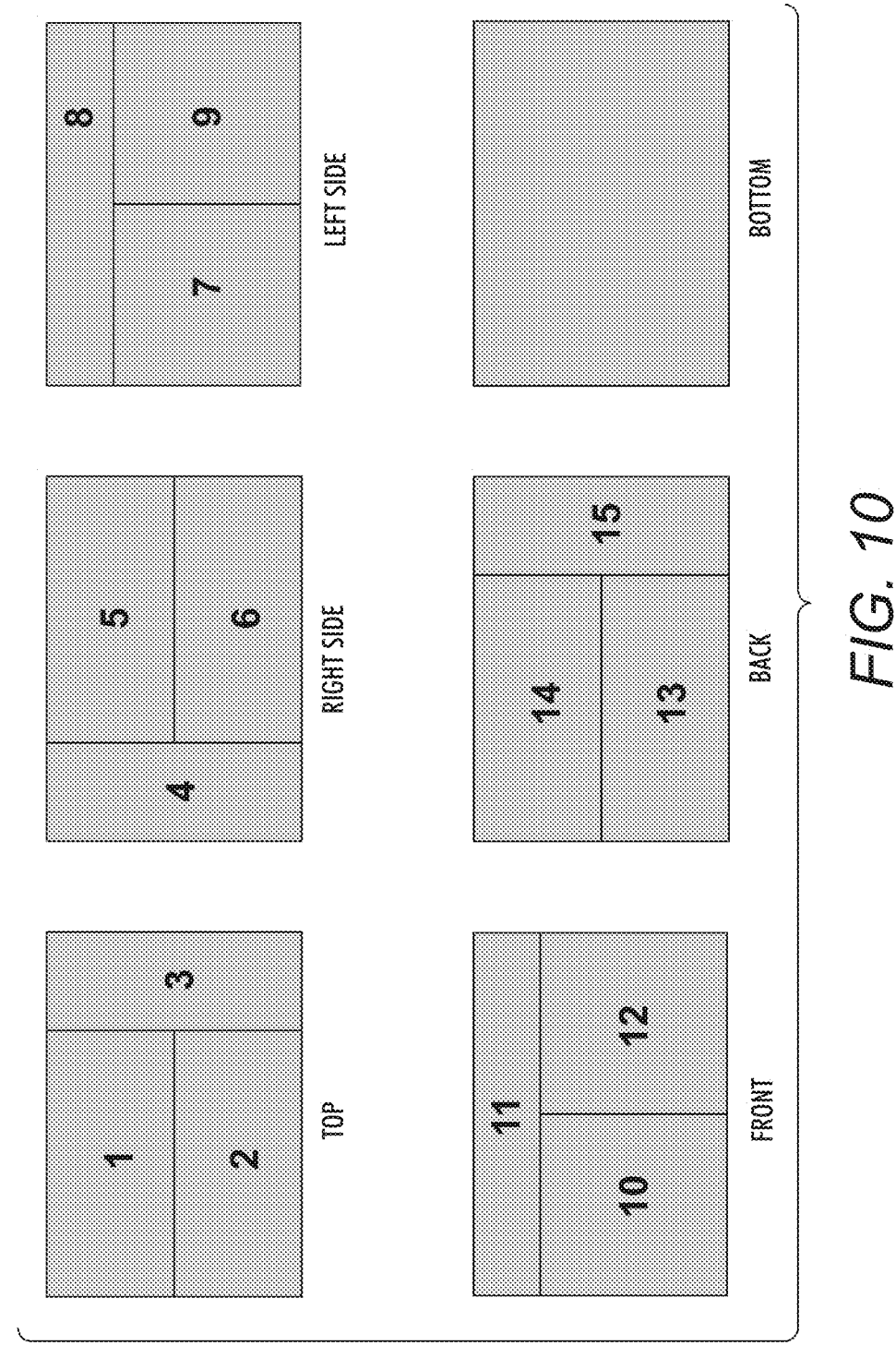
FIG. 10 illustrates an example structural document layout according to an embodiment.

FIG. 10 illustrates six example faces of a cube structural document according to an embodiment. As illustrated by FIG. 10, the corresponding structural document design may specify that no images are to be displayed on the bottom face. If fifteen images are received, and there are five possible faces, then the image area may be equal to '3' (i.e., 15 images/5 faces). A structural document design may include the layouts for the top, left side, right side, front and back of the structural document as illustrated by FIG. 10. Each area of the structural document design is designated in FIG. 10 by a corresponding number.

Table 2 illustrates example aspect ratios associated with the areas shown in FIG. 10 according to an embodiment.

TABLE 2

| Area | Aspect Ratio |
| --- | --- |
| 1 | 1.50 |
| 2 | 1.50 |
| 3 | 0.50 |
| 4 | 0.50 |
| 5 | 1.50 |
| 6 | 1.50 |
| 7 | 0.83 |
| 8 | 2.50 |
| 9 | 0.83 |
| 10 | 0.83 |
| 11 | 2.50 |
| 12 | 0.83 |
| 13 | 1.50 |
| 14 | 1.50 |
| 15 | 0.50 |

In an embodiment, an area list may be created 312 for the areas of a determined layout. An area list may be a listing of the areas of a layout. In an embodiment, areas in an area list may be arranged in order of their corresponding aspect ratios. For example, areas in an area list may be arranged from highest aspect ratio to lowest aspect ratio. As another example, areas in an area list may be arranged from lowest aspect ratio to highest aspect ratio. Additional and/or alternate orderings may be used within the scope of this disclosure. For example, Table 3 illustrates an example area list for the areas identified in Table 2. As illustrated by Table 3, the areas are listed from highest aspect ratio to smallest aspect ratio.

TABLE 3

| Area | Aspect Ratio |
| --- | --- |
| 8 | 2.50 |
| 11 | 2.50 |
| 1 | 1.50 |
| 2 | 1.50 |
| 5 | 1.50 |
| 6 | 1.50 |
| 13 | 1.50 |
| 14 | 1.50 |
| 7 | 0.83 |
| 9 | 0.83 |
| 10 | 0.83 |
| 12 | 0.83 |
| 3 | 0.50 |
| 4 | 0.50 |
| 15 | 0.50 |

In an embodiment, an aspect ratio associated with one or more received images may be determined 314. An image list may be created 316. An image list may be a listing of one or more received images. In an embodiment, received images may be arranged in order of their corresponding aspect ratios. For example, received images in an image list may be arranged from highest aspect ratio to lowest aspect ratio. As another example, received images in an image list may be arranged from lowest aspect ratio to highest aspect ratio. Additional and/or alternate orderings may be used within the scope of this disclosure. Table 4 illustrates aspect ratios for example images according to an embodiment.

TABLE 4

| Image | Aspect Ratio |
| --- | --- |
| A | 0.47 |
| B | 1.42 |
| C | 1.86 |
| D | 0.96 |
| E | 2.52 |
| F | 1.50 |
| G | 0.53 |
| H | 0.75 |
| I | 0.86 |
| J | 2.35 |
| K | 1.55 |
| L | 1.47 |
| M | 0.70 |
| N | 0.78 |
| O | 1.52 |

Table 5 illustrates an image list corresponding to the images of Table 4 that are ordered from highest aspect ratio to lowest aspect ratio according to an embodiment.

TABLE 5

| Image | Aspect Ratio |
| --- | --- |
| E | 2.52 |
| J | 2.35 |
| C | 1.86 |
| K | 1.55 |
| O | 1.52 |
| F | 1.50 |
| L | 1.47 |
| B | 1.42 |
| D | 0.96 |
| I | 0.86 |
| N | 0.78 |
| H | 0.75 |
| M | 0.70 |
| G | 0.53 |
| A | 0.47 |

In an embodiment, an image from the received images may be assigned 318 to an area on a face. The area to which an image is assigned 318 may be the area of the structural document on which the image will be displayed. In an embodiment, an image may be assigned 318 to an area based on an aspect ratio associated with the image and the area. In an embodiment, an image may be assigned 318 to an area based on its position in an image list. For example, an image list and an area list may be sorted from highest aspect ratio to lowest aspect ratio of images and areas respectively. A first image in an image list may be assigned 318 to a first area in an area list, a second image in an image list may be matched to a second area in an area list and so on.

For example, referring to Table 4 and Table 5, Image E may be assigned 318 to Area 8 because Image E and Area 8 are associated with the largest aspect ratios from their respective lists. Table 6 illustrates example matches for the images and areas illustrated in Table 4 and Table 5 according to an embodiment.

TABLE 6

| Image | Area | Image Aspect Ratio | Area Aspect Ratio |
| --- | --- | --- | --- |
| E | 8 | 2.52 | 2.50 |
| J | 11 | 2.35 | 2.50 |
| C | 1 | 1.86 | 1.50 |
| K | 2 | 1.55 | 1.50 |
| O | 5 | 1.52 | 1.50 |

TABLE 6-continued

| Image | Area | Image Aspect Ratio | Area Aspect Ratio |
|---|---|---|---|
| F | 6 | 1.50 | 1.50 |
| L | 13 | 1.47 | 1.50 |
| B | 14 | 1.42 | 1.50 |
| D | 7 | 0.96 | 0.83 |
| I | 9 | 0.86 | 0.83 |
| N | 10 | 0.78 | 0.83 |
| H | 12 | 0.75 | 0.83 |
| M | 3 | 0.70 | 0.50 |
| G | 4 | 0.53 | 0.50 |
| A | 15 | 0.47 | 0.50 |

In an embodiment, the determined layout may be evaluated 320 to determine whether the fit of images to areas is acceptable. A layout may be evaluated 320 by determining 322 a fit ratio of aspect ratios for one or more faces. For one or more faces, a fit ratio of the aspect ratio an area of the face to the aspect ratio of the image assigned to that area may be determined 322 for one or more areas of the face. For example, referring to FIG. 3 and Table 6, the top face of a structural document may include Areas 1, 2 and 3, which may be assigned Images C, K and M respectively.

A fit ratio for Area 1 may be represented by:

$$\frac{\text{Aspect\_ratio\_of\_Area\_1}}{\text{Aspect\_ratio\_of\_Image\_C}} = \frac{1.50}{1.86} = 0.81$$

A fit ratio for Area 2 may be represented by:

$$\frac{\text{Aspect\_ratio\_of\_Area\_2}}{\text{Aspect\_ratio\_of\_Image\_K}} = \frac{1.50}{1.55} = 0.97$$

A fit ratio for Area 3 may be represented by:

$$\frac{\text{Aspect\_ratio\_of\_Area\_3}}{\text{Aspect\_ratio\_of\_Image\_M}} = \frac{0.50}{0.70} = 0.71$$

In an embodiment, an average fit ratio may be determined 324 for one or more faces. An average fit ratio may be determined 324 by summing the fit ratios associated with each area of a face and dividing the sum by the number of areas of the face. For example, an average fit ratio for the top face of a structural document illustrated in FIG. 3 may be determined 324 by the following:

$$(\text{Fit ratio of Area 1} + \text{Fit ratio of Area 2} + \text{Fit ratio of Area 3})/3 =$$

$$\frac{0.81 + 0.97 + 0.71}{3} = \frac{2.49}{3} = 0.83$$

In an embodiment, the closer the value of a fit ratio and/or an average fit ratio to '1', the better the fit of a layout. In an embodiment, if an average fit ratio may be compared 326 to a threshold value to determine whether the layout has an unsatisfactory fit. For example, if an average fit ratio of one or more faces exceeds a threshold value, a new layout may be determined 328 because the fit of the current layout may be deemed to be unsatisfactory. For instance, if an average fit ratio of one or more faces exceeds 1.80, then a new layout may be determined 328 for a structural document. In an embodiment, if an average fit ratio does not exceed a threshold value, a new layout may be determined 328 because the fit of the current layout may be deemed to be unsatisfactory. For example, if an average fit ratio of one or more faces does not exceed 0.85, then a new or updated layout may be determined 328. Additional and/or alternate threshold values may be used within the scope of this disclosure.

As an example, two images each having an aspect ratio of 1/2 may be allocated to a facet of a structural document, and FIG. 5 and FIG. 6 may illustrate possible layouts for such an allocation. A comparison of aspect ratios may be used to determine which layout to use. Table 7 illustrates example aspect ratios associated with the two images and the areas depicted in FIG. 5 and FIG. 6 according to an embodiment. As illustrated by Table 7, the layout illustrated by FIG. 6 is the better choice because the aspect ratios of the images correspond to the aspect ratios of the areas.

TABLE 7

| Layout | First image aspect ratio | Second image aspect ratio | Top area aspect ratio | Bottom area aspect ratio |
|---|---|---|---|---|
| FIG. 5 | 1/2 | 1/2 | 2 | 2 |
| FIG. 6 | 1/2 | 1/2 | 1/2 | 1/2 |

In an embodiment, if a new or updated layout needs to be determined, then as illustrated by FIG. 3, steps 310-326 may be repeated with respect to another layout. In an embodiment, if a new or updated layout does not need to be determined, then a graphical representation of one or more faces and/or one or more images may be displayed 330 to a user. For example, a graphical representation showing the placement of the images on their corresponding areas of the structural document faces may be displayed 330 to a user.

In an embodiment, one or more changes to the displayed graphical representation of the structural document may be received 332 from a user. For example, a user may have the ability to change one or more features of the layout, the images, the areas, the placement of figures and/or the like. For instance, a user may change a layout to specify that a face that was previously left empty, such as, for example, the bottom face, displays images. As another example, a user may change the size of a structural document, the placement of images on a structural document and/or the like. In an embodiment, changes made by a user may alter one or more aspect ratios of a layout. For example, changing the size of a structural document in turn changes the aspect ratios of faces and/or areas of a layout.

In an embodiment, if one or more changes 332 are received from a user, then a new layout may be determined 328 and steps 310-326 of FIG. 3 may be repeated with respect to the new layout. As such, the system may dynamically determine a new structural document layout based on feedback from a user.

In an embodiment, an indication that the user is finished providing feedback may be received 334. For example, a user may select a "Finished" button, or provide some other type of indication that the user is satisfied with a layout.

Unlike other layout applications, the system described herein is able to dynamically change or adjust the physical size, relative ratios of sizes and aspect ratios of one or more structural document layouts. As such, a layout incorporates non-constant size and shape attributes and can dynamically adjust in response to sizing changes.

Figure 11:
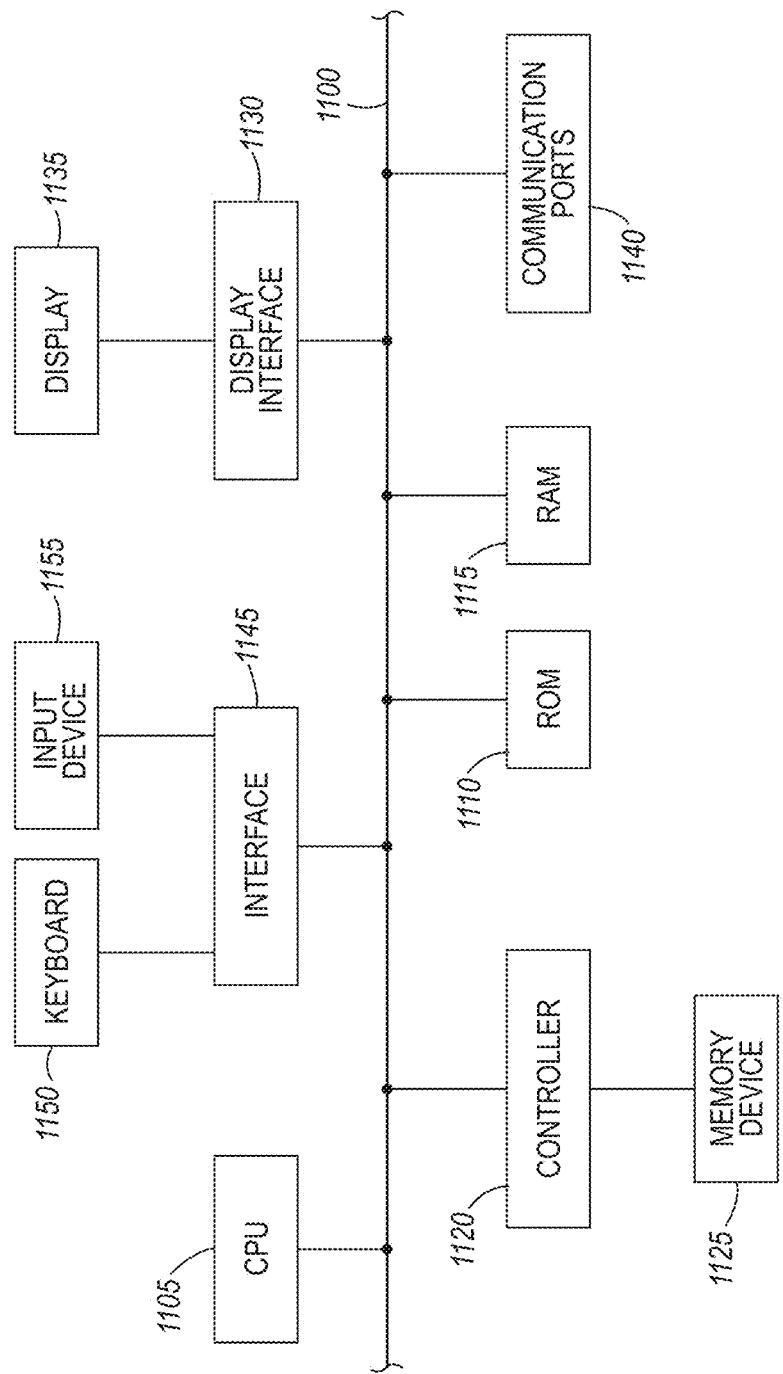
FIG. 11 illustrates a block diagram of hardware that may be used to contain or implement program instructions according to an embodiment.

FIG. 11 depicts a block diagram of hardware that may be used to contain or implement program instructions. A bus 1100 serves as the main information highway interconnecting the other illustrated components of the hardware. CPU 1105 is the central processing unit of the system, performing calculations and logic operations required to execute a program. CPU 1105, alone or in conjunction with one or more of the other elements disclosed in FIG. 11, is an example of a production device, computing device or processor as such terms are used within this disclosure. Read only memory (ROM) 1110 and random access memory (RAM) 1115 constitute examples of non-transitory computer-readable storage media.

A controller 1120 interfaces with one or more optional non-transitory computer-readable storage media 1125 to the system bus 1100. These storage media 1125 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 1110 and/or the RAM 1115. Optionally, the program instructions may be stored on a tangible non-transitory computer-readable medium such as a compact disk, a digital disk, flash memory, a memory card, a USB drive, an optical disc storage medium, such as a Blu-ray™ disc, and/or other recording medium.

An optional display interface 1130 may permit information from the bus 1100 to be displayed on the display 1135 in audio, visual, graphic or alphanumeric format. Communication with external devices, such as a printing device, may occur using various communication ports 1140. A communication port 1140 may be attached to a communications network, such as the Internet or an intranet.

The hardware may also include an interface 1145 which allows for receipt of data from input devices such as a keyboard 1150 or other input device 1155 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method performed by a first computing device for determining a layout of a structural document, the method comprising:
 receiving a plurality of images from a second computing device;
 determining a design associated with a structural document, the structural document comprising one or more facets, each facet representing one or more exterior surfaces of the structural document;
 determining a number of facets associated with the structural document based on the determined design;
 determining an image area associated with the structural document based on the received plurality of images and the number of facets;
 determining an image aspect ratio associated with each of the plurality of received images;
 determining a layout associated with the structural document based on the determined image area by: determining one or more areas of each facet in the number of facets;
 for each area of each facet in the number of facets:
  determining an area aspect ratio associated with each of the one or more areas;
  assigning a received image to the area, and
  determining a fit ratio comprising a ratio of the determined aspect ratio associated with the area and the determined aspect ratio associated with the image assigned to the area;
 evaluating the layout by:
  for each facet in the number of facets, determining an average fit ratio of aspect ratios associated with the facet, and
  determining whether the average fit ratio of aspect ratios exceeds a threshold value;
 when the average fit ratio of aspect ratios exceeds a threshold value for one or more of the facets in the number of facets, determining a new layout associated with the structural document and evaluating the new layout; and
 when the average fit ratio of aspect ratios for all facets associated with the evaluated layout does not exceed the threshold value, causing a graphical representation of the structural document to be displayed at the second computing device, wherein each received image is displayed on its assigned area on the graphical representation.

2. The method of claim 1, wherein determining a design associated with a structural document comprises receiving a selection of a design from a user.

3. The method of claim 1, wherein determining an image area associated with the structural document comprises:
 determining a number of received images; and
 determining an average image area by dividing the number of received images by the number of facets.

4. The method of claim 3, wherein determining the layout associated with the structural document based on the determined image area comprises determining the one or more areas of each facet in the number of facets by:
 determining a number of images on a facet by dividing a size associated with the facet by the average image area.

5. The method of claim 1, wherein determining the layout based on the determined image area further comprises:
 generating an image list, wherein the image list comprises the received images arranged in an order based on associated aspect ratios;
 generating an area list, wherein the area list comprises the areas arranged in an order based on associated aspect ratios;
 assigning a first image in the image list to a first area in the area list;
 assigning a next image in the image list to a next area in the area list; and
 repeating the assigning a next image until all of the images in the image list are assigned to an area in the area list.

6. The method of claim 1, wherein:
 determining an average fit ratio of aspect ratios comprises:
  determining a total fit ratio of aspect ratios by summing the fit ratios associated with each area of the facet, and determining a ratio of the total fit ratio of aspect ratios and a number of areas associated with the facet.

7. The method of claim 1, further comprising:
receiving one or more changes to the displayed graphical representation of the structural document from a user of the second computing device;
determining a new design associated with the structural document that incorporates the one or more changes;
determining an updated number of facets associated with the structural document based on the new design;
determining an updated image area associated with the structural document based on the received plurality of images and the updated number of facets;
determining an updated layout associated with the structural document based on the determined image area; and
evaluating the updated layout by:
for each facet in the updated number of facets, determining an average fit ratio of aspect ratios associated with the facet, and
determining whether the average fit ratio of aspect ratios exceeds a threshold value.

8. A system of determining a layout of a structural document, the system comprising:
a first computing device; and
a computer-readable storage medium in communication with the first computing device, the computer-readable storage medium comprising one or more programming instructions that, when executed, cause the first computing device to:
receive a plurality of images from a second computing device,
determine a design associated with a structural document, the structural document comprising one or more facets, each facet representing one or more exterior surfaces of the structural document,
determine a number of facets associated with the structural document based on the determined design,
determine an image area associated with the structural document based on the received plurality of images and the number of facets;
determine an image aspect ratio associated with each of the plurality of received images,
determine a layout associated with the structural document based on the determined image area by: determining one or more areas of each facet in the number of facets,
for each area of each facet in the number of facets:
determine an area aspect ratio associated with each of the one or more areas,
a received image to the area, and
determining a fit ratio comprising a ratio of the determined aspect ratio associated with the area and the determined aspect ratio associated with the image assigned to the area,
evaluate the layout by:
for each facet in the number of facets, determine an average fit ratio of aspect ratios associated with the facet, and
determine whether the average fit ratio of aspect ratios exceeds a threshold value,
when the average fit ratio of aspect ratios exceeds a threshold value for one or more of the facets in the number of facets, determine a new layout associated with the structural document and evaluating the new layout, and when the average fit ratio of aspect ratios for all facets associated with the evaluated layout does not exceed the threshold value, cause a graphical representation of the structural document to be displayed at the second computing device, wherein each received image is displayed on its assigned area on the graphical representation.

9. The system of claim 8, wherein the one or more programming instructions that, when executed, cause the computing device to determine a design associated with a structural document comprise one or more programming instructions that, when executed, cause the computing device to receive a selection of a design from a user.

10. The system of claim 8, wherein the one or more programming instructions that, when executed, cause the computing device to determine an image area associated with the structural document comprise one or more programming instructions that, when executed, cause the computing device to:
determine a number of received images; and
determine an average image area by dividing the number of received images by the number of facets.

11. The system of claim 8, wherein the one or more programming instructions that, when executed, cause the computing device to determine the layout associated with the structural document based on the determined image area further comprises one or more programming instructions that, when executed, cause the computing device to:
generate an image list, wherein the image list comprises the received images arranged in an order based on associated aspect ratios,
generate an area list, wherein the area list comprises the areas arranged in an order based on associated aspect ratios,
assign a first image in the image list to a first area in the area list,
assign a next image in the image list to a next area in the area list, and
repeat the assigning a next image until all of the images in the image list are assigned to an area in the area list.

12. The system of claim 8, wherein:
the one or more programming instructions that, when executed, cause the computing device to determine an average fit ratio comprise one or more programming instructions that, when executed, cause the computing device to:
determine a total fit ratio of aspect ratios by summing the fit ratios of aspect ratios associated with each area of the facet, and
determine a ratio of the total fit ratio of aspect ratios and a number of areas associated with the facet.

13. The system of claim 8, wherein the computer-readable storage medium further comprises one or more programming instructions that, when executed, cause the computing device to:
receive one or more changes to the displayed graphical representation of the structural document from a user of the second computing device,
determine a new design associated with the structural document that incorporates the one or more changes,
determine an updated number of facets associated with the structural document based on the new design,
determine an updated image area associated with the structural document based on the received plurality of images and the updated number of facets,
determine an updated layout associated with the structural document based on the determined image area; and evaluate the updated layout by:
for each facet in the updated number of facets, determining an average fit ratio of aspect ratios associated with the facet, and
determining whether the average fit ratio of aspect ratios exceeds a threshold value.

\* \* \* \* \*